July 27, 1943.  E. A. DERUNGS  2,325,486
CONTROL SYSTEM FOR MOTOR VEHICLES
Filed Sept. 11, 1939  2 Sheets-Sheet 1
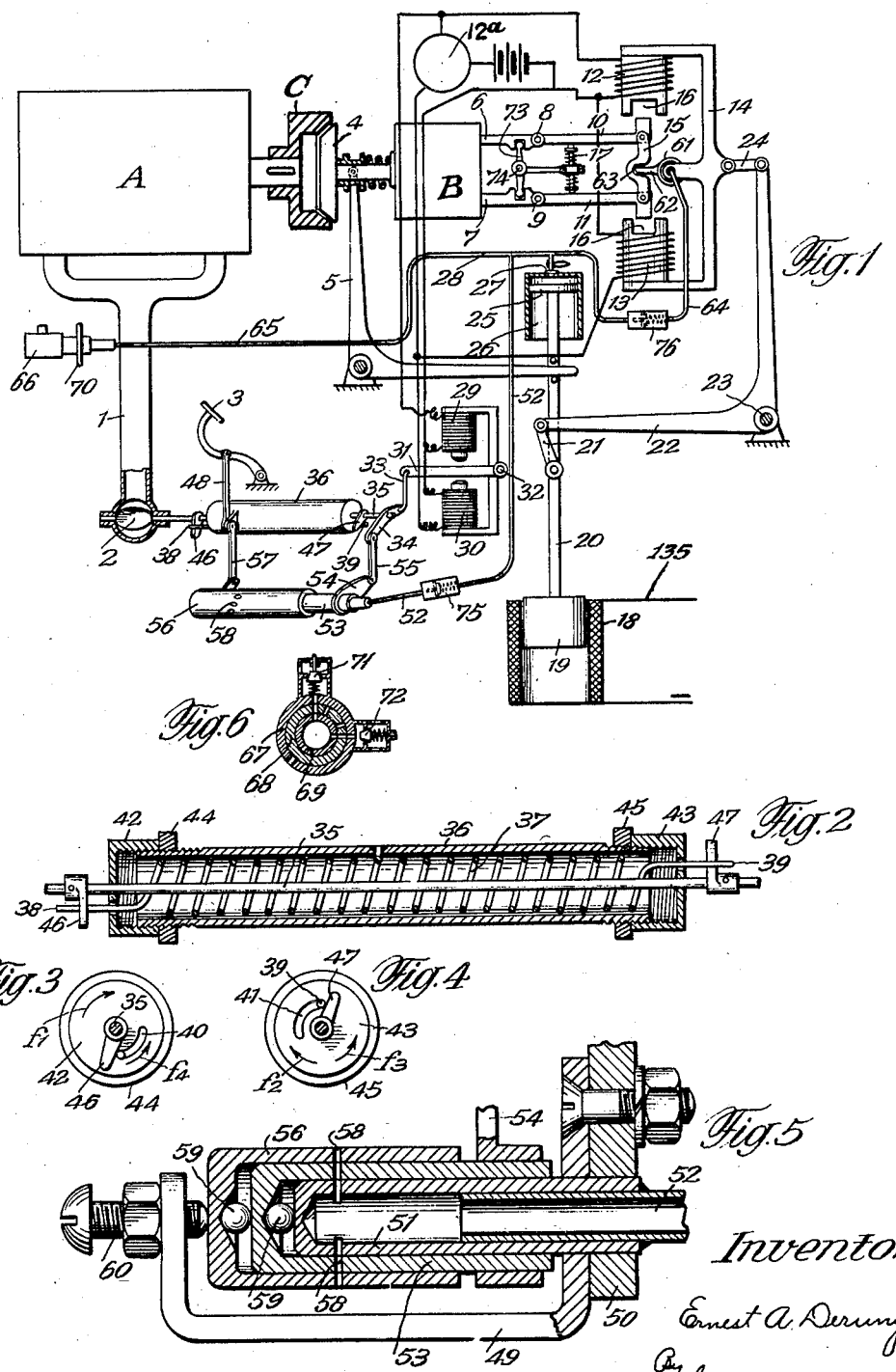

July 27, 1943.  E. A. DERUNGS  2,325,486
CONTROL SYSTEM FOR MOTOR VEHICLES
Filed Sept. 11, 1939  2 Sheets-Sheet 2
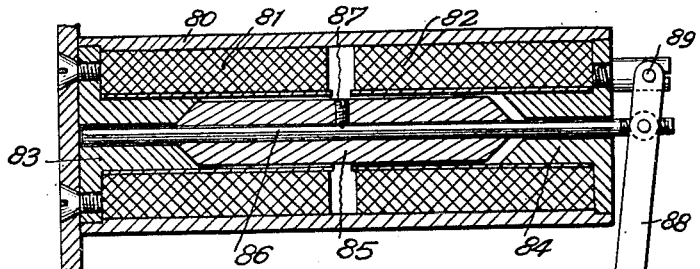
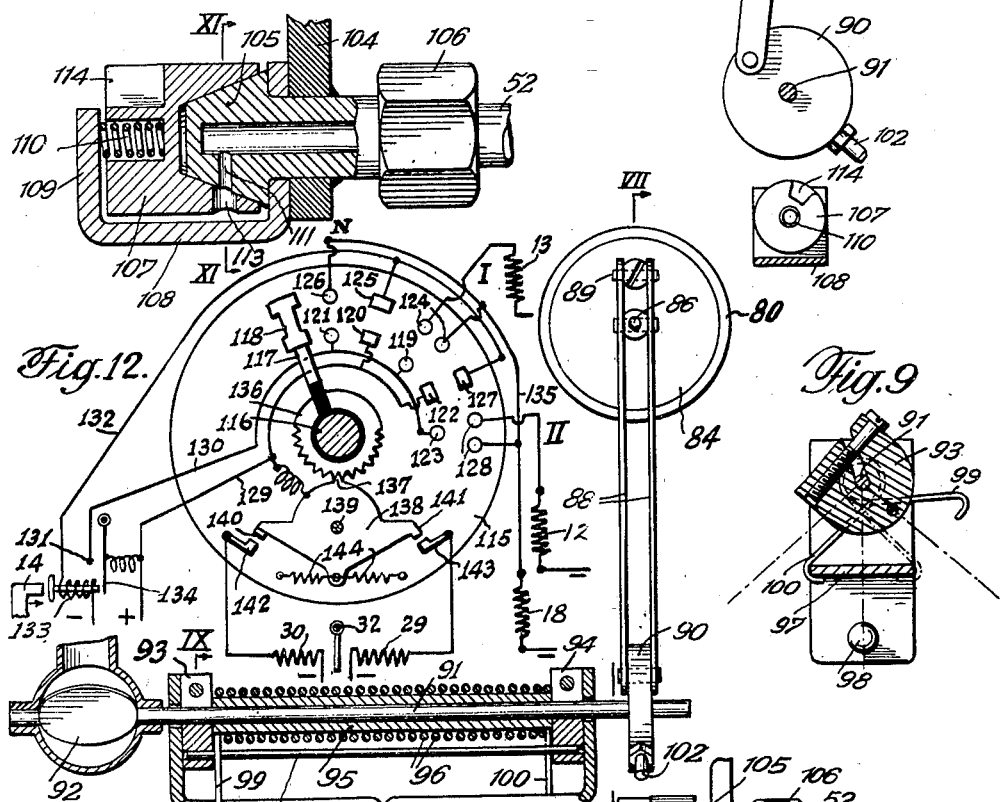
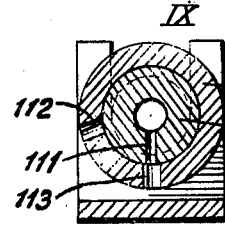

Patented July 27, 1943

2,325,486

UNITED STATES PATENT OFFICE 2,325,486

CONTROL SYSTEM FOR MOTOR VEHICLES

Ernest Alphonse Derungs, Neuilly sur Seine, France; vested in the Alien Property Custodian Application September 11, 1939, Serial No. 294,385
In Switzerland September 10, 1938

10 Claims. (Cl. 192—.01)

(Granted under the provisions of sec. 14, act of
March 2, 1927; 357 O. G. 5)

This invention relates to control systems for motor vehicles of the type provided with a clutch and a change speed gear and comprising normal hand or pedal operated acceleration means.

In the operation of motor vehicles it is important to observe adequate times and a correct succession of operations when changing speeds and engaging the clutch, as well when starting the vehicle as in the course of travel so as to avoid shocks and losses of speed.

The object of the present invention is to realize an improved manner of automatically controlling the changes of speed of a motor vehicle by taking into account at the same time the condition of travel of the vehicle and the position of the gears in the change speed gear and of the clutch.

A further object of the invention is to automatically control the supply of fuel to the motor according to the requirements depending on the change of speed which is effected.

A still further object is the provision of a retarding device capable of controlling the duration of the operations required for effecting a change of speed.

The invention will now be explained in connection with the accompanying drawings showing by way of example and in diagrammatic manner the specific arrangement of a control system according to the invention.

In the particular case of a control system as applied to an automobile, a change of speed can be effected only when the clutch is released and there must be effected, during the period of release, an acceleration or a retarding of the motor according to whether or not the ratio of reduction is increased or decreased.

During a predetermined time which generally depends on the conditions of travel, means must be operable to automatically increase or decrease the rate of admission of the motor and to return to the normal rate of admission as soon as the new speed ratio has been introduced; afterwards the engagement of the clutch must be effected also in a predetermined time which depends at least on the speed of the vehicle, so as not to create any shocks due to the variations of inertia of the motor and of the vehicle.

In the drawings,

Fig. 1 represents a diagrammatic view of a system developed in accordance with the present invention and applied to a motor car having a combustion motor, a clutch and a change speed gear which, for the purpose of facilitating illustration, is represented as having two speeds.

Fig. 2 represents in longitudinal section a portion of the gas admission control device.

Figs. 3 and 4 represent each an end view of the device shown in Fig. 2.

Fig. 5 is a longitudinal section of a regulating cock.

Fig. 6 represents in transverse section a modification of a regulating cock.

Fig. 7 is a longitudinal sectional view of a modified form of electromagnet of the admission control device.

Fig. 8 is a side sectional view of a throttle actuating gear under the control of the electromagnet of Fig. 7.

Fig. 9 is a transverse sectional view on the line IX—IX of Fig. 8.

Fig. 10 is a longitudinal sectional view of a form of retarding device.

Fig. 11 is a transverse sectional view of a retarding device on the line XI—XI of Fig. 10.

Fig. 12 is a diagrammatic view of a switching device for controlling the electric circuits of the system shown in Fig. 1.

In Fig. 1, A represents the motor, B the change speed gear and C the clutch. The admission conduit 1 of the gas is provided with a throttle valve 2 which is controlled by the acceleration pedal 3, by the intermediary of members which are described hereinafter. The clutch C is of an ordinary type employed in motor vehicles and is provided with a releasing sleeve 4 which is actuated by the clutch lever 5. The change speed gear B has been represented by a box for two speeds, but it is well understood that the system according to the invention can be utilized as well with an ordinary box for four speeds, or with a box comprising any number of speeds. The sliding shafts of the speed box are controlled by the two rods 6 and 7 which are hingedly connected, at 8 and 9, to the armature levers 10 and 11 of two electro-magnets 12 and 13 which are carried by a movable frame 14. The two electro-magnets can be alternately operated by means of the switching device 12a shown in Fig. 12 and which is described hereinafter. The two armatures 10 and 11 are connected together by a small rod 15, so that when one of the armatures is attracted and enters into the recess 16 of one of the cores of the electro-magnets, the other armature is obliged to follow this movement and to move out of the recess 16 of the other electro-magnet. A spring retracting device 17 always tends to bring the armatures back into the median position represented in Fig. 1.

The frame 14 can move in the direction of the central axis of the motor and of the change speed gear, this movement of the frame being produced by a driving device formed by an electro-magnet 18, the movable core 19 of which is carried by a driving rod 20, connected by a link 21 to a lever 22 having its axis at 23 which is itself connected by a link 24 to the frame 14. The rod 20 also controls the clutch lever 5. The end of the rod 20 carries a piston 25 moving in a cylinder 26. This piston device constitutes a brake or a fluid operated retarding device. The bottom of the cylinder 26 is provided with a small opening 27 which is in communication with a fluid distribution net 28, the utilized fluid being preferably constituted by air.

The throttle valve 2 is controlled, on the one hand by the pedal 3, and on the other hand, by a mechanical control device, which starts its action, for example, when the driver of the vehicle actuates the previously mentioned switching device 12a in order to effect a change of speed as will be described hereinafter. The control movement of the throttle is produced by two electro-magnets 29 and 30 connected with switching device 12a acting alternatively on a single armature 31 hingedly connected at 32 to the frame of the electro-magnets. This armature is connected by a link 33 to a lever 34 secured to a rod 35 which carries the throttle 2. When one or the other of the electro-magnets 29 and 30 is excited, the armature 31 is attracted towards the corresponding core and produces a movement of rotation of the lever 34 and accordingly of the rod 35 and of the throttle 2 in one or the other direction, whereby an acceleration or a retarding of the motor is produced.

The movement of the pedal 3 is communicated to the throttle 2 by the intermediary of a flexible transmission which comprises a tubular rigid shaft 36 through which extends the rod 35, and a coiled spring 37 the middle coil of which is rigid with the shaft 36, for example by soldering (Fig. 2). The two ends 38 and 39 of the spring traverse slots 40 and 41 extending through an angle of about 60° in the bottom of clamping nuts 42 and 43 which are screwed on the two ends of the tubular shaft 36, permitting adjustment of the initial tension of the spring and which are maintained in their positions by counter nuts 44 and 45. The two ends 38 and 39 of the spring bear against abutments 46 and 47 carried by the central rod 35. The pedal 3 is connected by a link 48 to the tubular shaft 36. When the pedal is pressed down to accelerate the motor, a movement of rotation is communicated to the tubular shaft in the direction of the arrow f1 in Fig. 3. The spring, being rigid in its center with the tubular shaft, turns with the shaft and the end 38 of the spring, bearing against the abutment 46, communicates a movement of rotation to the central rod 35 which controls the throttle. When the pedal is released, the tubular shaft turns in opposite direction, as indicated by the arrow f2 in Fig. 4, and the end 39 of the spring bears against the abutment 47, and produces a movement of rotation of the rod 35 and of the throttle 2 in the direction corresponding to closure of the admission.

When, during the movement communicated to the throttle by means of the pedal, the electro-magnets 29 and 30 are not excited, the movement of the rod 35 is communicated by the lever 34 and the link 33 to the armature 31 which freely oscillates between the cores of the two electro-magnets. When the electro-magnet 29 is excited, the armature 31 is attracted towards the corresponding core and communicates to the rod 35 a movement of rotation in the direction of the arrow f3 in Fig. 4. This movement of the rod corresponds to the opening movement of the throttle 2. The abutment 47, rigid with the rod, acts against the end 39 of the spring. This latter cannot communicate the movement to the tubular shaft which is connected to the pedal on which the foot of the driver is resting; the spring accordingly is compressed and its end 39 moves along the slot 41, while the end 38 of the same spring remains stationary, being retained by the end of the slot 40. When the electro-magnet 30 is excited, the armature 31 is attracted downwardly in Fig. 1 and communicates to the rod 35 a movement of rotation in the direction of the arrow f4 in Fig. 3. The abutment 46 of the rod 35 acts against the end 38 of the spring. This end moves in the slot 40, while compressing the spring and the rod 35 produces rotation of the throttle 2 in the direction of the closure of the admission. When the rod 35 is controlled by the armature 31, the driver cannot transmit to the throttle 2 a movement by means of the pedal 3, since the effort which the spring 37 can transmit in the two directions of rotation is limited and does not suffice to overcome the force of attraction of one or the other of the electromagnets 29 and 30. A movement of the pedal, when the armature 31 is attracted, results only in a movement of rotation of the tubular shaft 36, while tensioning more or less the spring 37 the two ends of which remain applied, either against the abutments 46 and 47 maintained in their positions in which they have been brought by the attraction of the armature 31, or against the ends of the slots 40 and 41. However, as soon as excitation of the electro-magnets ceases and the armature 31 is released, the tension of the spring 37 retracts the rod 35 in its normal position which corresponds to the momentary position of the pedal 3, since that end of the spring which was applied against the edge of its slot acts now as fixed abutment. It is understood that the transmission device of the two manners of controlling the admission, pedal control and automatic control by the intermediary of the electro-magnets, permits simultaneous actuation of these two manners of control, but transmits, upon such simultaneous actuation, only the automatic control movement.

The transmission device of the two manners of control of the admission is connected to a regulating cock shown in section in Fig. 5. This cock is designed to adjust the exhaust of fluid from the cylinder 26 of the retarding device, or the admission of fluid into the cylinder, and to influence thereby the advancing speed of the piston 25. This cock comprises a support 49 fixed to a part 50 of the frame of the motor or of the vehicle, and on which are mounted three cylinders fitted one into the other. The contacting walls of the cylinders are machined and polished so as to ensure a practically perfect tightness between the different cylinders. The interior cylinder 51 is rigidly connected to the support 49 and to a tube 52 of the fluid distribution net 28. The intermediate cylinder 53 is secured to an arm 54 connected by a link 55 (Fig. 1) to the lever 34 which is carried by the control rod 35 of the throttle 2. The exterior cylinder 56 is connected by means of a link 57 to the tubular shaft 36. The three cylinders are provided with one or several holes 58 which, according to the relative angular position of the cylinders, can register with each other or are displaced one relative to the other. Abutment balls 59 are disposed between the bottoms of the three cylinders and an adjustment screw 60, carried by the support 49 permits adjustment of the play between the bottoms of the cylinders, in order to ensure their perfect mobility.

When the transmission device of the acceleration control of the motor is actuated, the movements of the tubular shaft 36 and of the rod 35 are transmitted by links 57 and 55 to the cylinders 56 and 53. When the pedal 3 alone is effective for controlling the acceleration, the shaft 36 and the rod 35 turn together as a single rigid member and the relative position of the holes in the two cylinders 53 and 56 is not modified (the section of passage being a maximum). However, when the automatic control is operative, the rod 35 moves while the shaft 36 may remain stationary; the rod will always turn through the angle comprised between one of its two final positions, corresponding to one or the other position of attraction of the armature 31, and the momentary position of the shaft 36; the two cylinders 53 and 56 will therefore move one with respect to the other if these positions do not correspond; the greater the difference is between these positions, the more holes 58 of the cylinders will be closed. By modifying the free section of passage of the fluid through these holes, the speed of suction of fluid through the opening 27 of the cylinder 26 of the retarding device is modified in the same sense, that is to say, this speed increases when the section of passage increases, and decreases when the section of passage decreases.

A second cock 61, similar to that represented in Fig. 5, is carried by the frame 14 of the two electromagnets 12 and 13 (Fig. 1). In this cock the intermediate cylinder is rigidly connected to the frame 14, while the exterior cylinder carries an arm 62 penetrating into a recess 63 of the rod 15. When the levers 10 and 11 are attracted towards one or the other core of the electromagnets 12 and 13, the recess 63 of the rod 15 drives the arm 62 which communicates a movement of rotation to the exterior cylinder of the cock, so as to modify the section passage of the holes by the relative movement of the two cylinders. The interior cylinder of this cock is connected to the fluid distribution net 28 by a tube 64. This device serves for adjustment of the duration of the engaging movement of the clutch owing to the rate of compression of the fluid in the cylinder 26 being dependent on the adjustment of the cock 61.

A third tube 65 of the fluid distribution net arrives at the interior cylinder of a third adjusting cock 66, which can be operated by hand, and which is represented in section in Fig. 6. This cock comprises three cylinders 67, 68 and 69. The intermediate cylinder 68 can be turned by hand, by means of any actuating member 70, while the interior and the exterior cylinders are stationary. The exterior cylinder 67 carries two valves 71 and 72 which can establish a communication between the inner cylinder and the exterior air. One of the valves opens when a compression is present in the tube 65 and the other valve opens when a depression is present in this tube. The three cylinders are provided with holes permitting the establishment, either of a simultaneous communication of the two valves with the space contained in the interior cylinder, or a communication of one of the valves only with this space, while the communication of the other valve with this space is interrupted, so that the cock only regulates the compression or only the depression in the cylinder 26 of the retarding device.

The switching device for controlling the circuits of various electro-magnets used in the system represented in Fig. 1 is diagrammatically shown in Fig. 12. A switching device of this type is particularly described in applicant's copending application Ser. No. 272,242, now Patent No. 2,250,221, and does not form a part of the present invention. An insulating disc 115 is provided with a journal 116 on which can turn a switch arm 117 of insulating material which carries a contact piece 118. The disc 115 carries two series of contacts disposed coaxially with the journal 116, one of the series comprises five contacts 119, 120, 121, 122 and 123, and the second series comprising five other contacts which are disposed in substantial radial alignment with the five contacts of the first series and comprise a double contact 124, contacts 125, 126 and 127, and a double contact 128. Upon rotation of the switch arm 117, its contact piece 118 successively connects each of the contacts of the first series with the corresponding radially aligned contact of the second series.

The two contacts 120 and 122 are connected to a conductor 129 which is connected to the positive pole of a current supply. The contacts 119, 121 and 123 are connected to a conductor 130 leading to a contact 131. The contacts 125 and 127 are connected to a conductor 132 leading to a relay 133 which is also connected to the negative pole of the current supply. The armature 134 of the relay is attracted when the relay is excited and then abuts against the contact 131 to connect the positive pole of the current supply to the conductor 130.

The contact 126 and one contact of each of the double contacts 124 and 128 are connected to a conductor 135 leading to the electro-magnet 18 (Fig. 1) which is also connected to the negative pole of the current supply. The second contact of the double contact 124 is connected to the electro-magnet 13, while the second contact of the double contact 128 is connected to the electro-magnet 12.

To the contact arm 117 is rigidly connected a disc 136 having a portion of its periphery provided with teeth coacting with a single tooth 137 of a conducting oscillatory sector 138 mounted on an axis 139 carried by the disc 115 and electrically connected to the conductor 129. The sector 138 carries two contacts 140 and 141 coacting with two fixed contacts 142 and 143, respectively. The contact 142 is connected to the electro-magnet 30 and the contact 143 is connected to the electro-magnet 29, these two electro-magnets cooperating with the common armature 31 which controls the rod 35 of the gas throttle 2.

The described system operates in the following manner:

Supposing that the vehicle is running at first speed and that it is desired to reduce the ratio of reduction and to pass to second speed. When the vehicle is running at first speed, the switch arm 117 is in the position I (Fig. 12), and in order to obtain second speed, the driver must bring it to the position II. When turning the arm 117 from position I to position II the contact piece 118 first passes over contacts 122 and 127 and accordingly establishes the following circuit: positive pole of the current supply, conductor 129, contact 122, contact piece 118, contact 127, conductor 132, relay 133, negative pole of the current supply. The armature 134 is attracted and remains in its attracted position even when the relay 133 is deenergized. The arm 117 moves further and when it arrives in the position II the contact piece 118 connects the contact 123 with the double contact 128. The attracted armature 134 now closes the following circuit: positive pole of the current supply, contact 131, conductor 130, contact 123, double contact 128, and then the current passes simultaneously, on the one hand through conductor 135 to the electromagnet 18, and on the other hand to the electromagnet 12, which electromagnets are both connected to the negative pole of the current supply. The movable core 19 of the excited electromagnet 18 (Fig. 1) moves downwardly and the rod 20 actuates the lever 5 which produces the release of the clutch. At the same time the rod 20 actuates the lever 22 which moves the frame 14 towards the left, and the electro-magnet 12, attracting and engaging the armature 10, moves with the frame and pushes this armature and the sliding rod 6. This latter is coupled with the sliding rod 7 by a lever 73 pivoting on a fixed axis 74. When the sliding rod 6 advances towards the box B, the lever 73 retracts the sliding rod 7 of the box whereby the wheels of the first speed are disengaged before the sliding rod 6 has produced the meshing of the wheels of the second speed.

It is known that when driving a motor vehicle, the change of speed requires a retarding or an acceleration of the motor according to the ratio of reduction of the speed decreases or increases. In the particular case of a change from the first to the second speed, the motor must be retarded When the switch arm 117 is turned from position I to position II, the disc 136 moves with the arm, and its teeth acting against the tooth 137 of the sector 138, oblige this latter to oscillate so that the tooth 137 can slide over the teeth of the disc 136. The contact 140 abuts against contact 142 whereby the circuit of the electromagnet 30 is closed. The armature 31 is attracted and produces a rotation of the rod 35 of the throttle 2 in the direction of closure of the admission. The motor accordingly is slowed down at the moment where the frame 14 has advanced the sliding rod 6 through a distance where meshing of the wheels of the second speed begins.

Springs 144 act on the sector 138 to bring it to its normal position and separate the contacts 140 and 142 as soon as the switch arm 117, after having arrived in the position II, is released by the driver.

Owing to the attraction of the armature 31 and of the rotation of the lever 34, the two cylinders 53 and 56 of the cock, controlled by the transmission device of the control movement of the admission, have been displaced one with respect to the other. Supposing that before this displacement, the holes 58 of the different cylinders have been registering, they are now staggered one with respect to the other, and the communication between the tube 52 and the exterior air is at least partially obstructed. The entrance of air by the tube 52 into the cylinder 26, in proportion to the lowering of the piston 25, is prevented, and there is created a partial vacuum above the piston, this vacuum increasing with the lowering of the piston and exerting a braking action on this piston. It is naturally supposed that the cocks 61 and 66 are also at least partially closed. At the beginning of the downwards movement of the piston 25, this braking is not felt much and the disengagement of the clutch by the lever 5, as well as the disengagement of the wheels of the first speed is rapidly obtained, while towards the end of the descending movement of the piston, the vacuum and accordingly the braking action increases and the meshing of the wheels of the second speed is slowly and gradually performed. The manually operated cock 66 serves to adjust the vacuum in the cylinder 26, and therefore the braking action on the piston 25.

When the frame 14 arrives at the end of its stroke, it abuts against the relay 133, as diagrammatically represented in Fig. 12, and produces the release of the armature 134 which returns to its position of rest. The previously established electric circuits are interrupted at the contact 131 and the electro-magnets 12, 18 and 30 are deenergized. Owing to the action of the spring of the clutch C, the clutch engages and the link 20, core 19 and piston 25 are retracted to their position of rest. The engagement of the clutch must be gradually effected in a determined time which depends on the speed of the vehicle, as well as on the speed which is engaged in the change speed gear. In order to effect this regulation of the engaging time, the regulating action of the cock 61 precisely depends on the engaged speeds. When the second speed has been engaged, the sliding rod 6 is advanced and the sliding rod 7 is retracted with respect to the neutral position represented in Fig. 1. The link 15 accordingly takes an oblique position and its recess 63 produces a movement of the lever 62 and thus of the exterior cylinder of the cock 61. The holes for the passage of the air at least partially obstruct the discharge of air and the piston 25, which advances towards the bottom of the cylinder 26, produces a compression of the air in this cylinder which air is allowed to flow out slowly only through the opening 27. This compression increases in proportion to the advance of the piston, so that the coupling sleeve 4 will gradually move more slowly towards the end of its engaging stroke and thus produces a soft engagement without any shock. The manually operated cock 66 can again serve to regulate at will the braking action of the retarding device. When first speed is engaged, the sliding rod 6 is retracted and the rod 7 pushed forwards and the link 15 accordingly is inclined in a direction opposite to that which it had during engagement of second speed. The exterior cylinder of the cock 61 is turned in opposite direction and the holes for the passage of air are obstructed to a greater degree than for the engagement of second speed, because when engaging first speed for starting the vehicle, the clutch must be engaged slower to obtain a smooth starting, than when the vehicle is already running in first speed and a change to second speed is made.

In order that the adjustment of the depression in the cylinder 26, effected by the cock 53, 56, is not disturbed by the cock 61, and inversely, in order that the cock 53, 56 does not interfere with the adjustment of the compression effected by the cock 61, the two tubes 52 and 64 are each provided with a valve 75 and 76. The valve 75 opens under the effect of a depression in the cylinder 26 and closes upon a compression in this cylinder, so that the position of the cock 53, 56 cannot influence the adjustment of the compression by the cock 61. The valve 76 opens upon a compression in the cylinder 26 and closes during the period of depression.

In the modification of the admission control device according to Figs. 7 to 11, an electro-magnet 80 comprises two coils 81 and 82 having each a fixed core 83 and 84. A movable armature core 85, common to both coils, is secured to a rod 86 by means of a set screw 87. The armature core 85 can execute a limited to- and fro movement between the two fixed cores 83 and 84 in response to excitation of one or the other coil 81 and 82. The rod 86 is connected to a lever 88 pivoted by one of its ends at 89 and driving with its other end a disk 90 secured to a rod 91 which is connected to the admission throttle 92.

Two spaced disks 93 and 94 are clamped to the rod 91 which is surrounded by a spacing tube 95. Between these disks a spring 96 is coiled around the tube 95. The rod 91 is carried by a supporting bracket 97 which carries a pin 98 destined to be connected to the accelerator pedal. The spring 96 is wound with initial tension around the tube 95 and its two ends 99 and 100 engage the bracket 97 when the electro-magnet 80 is not excited. An abutment rod 101 extends intermediate the two disks 93 and 94 and passes between the two spring ends 99 and 100.

When the accelerator pedal is actuated, the supporting bracket 97 turns and the entire structure supported by the bracket turns together with the latter in the direction of opening of the throttle 92; upon release of the accelerator, the ordinary accelerator spring returns the bracket 97 and the rod 91 and throttle 92 to the position of closure of the admission. When a change of speed in the change speed gear is effected by means of the switching device shown in Fig. 12, in which the electro-magnets 29 and 30 would be replaced by the electro-magnet 80, one or the other of the coils 81 and 82 is excited, according to the ratio of reduction of the change speed gear is increased or decreased. The armature core is attracted towards one or the other fixed core 83 and 84, and the lever 88 turns the disk 90 in one or the other direction. The bracket 97 being held in a certain position by the foot of the driver, remains stationary and the disks 93 and 94 turn together with the throttle rod 91 relatively to the bracket, as represented in Fig. 9. The spring end 100 is held engaged by the bracket 97, while the other spring end 99 moves with the disks 93 and 94 owing to abutment against the rod 101 and causes tensioning of the spring 96. According to the direction of rotation of the disk 90 and 91, the admission is opened or closed, and when the change of speed has been effected and the excited coil 81 or 82 becomes deenergizd, the disks 93 and 94 of the transmission device and the rod 91 return to their normal position owing to the tension of the spring 96, and the spring end 99 again engages the bracket 97, as shown in dash and dot lines in Fig. 9.

The disk 90 on the throttle rod 91 carries a radially projecting pin 102 which serves to actuate a regulating cock 103 provided at the end of a tube 52 which leads to a retarding device such as represented by piston 25 and cylinder 26 in Fig. 1. This cock is carried by a fixed part 104 of the vehicle or of the motor and comprises a conical plug 105 which is connected by pipe coupling 106 to the tube 52. A valve member 107 having a conical recess which is complementary to the conical face of the plug 15, is engaged on this plug. A bracket 108 secured to the stationary part 104 is provided with an arm 109 serving as abutment for a spring 110 which urges the valve member 107 against the conical surface of the plug 105, whereby the two complementary conical surfaces form a tight joint. The plug 105 is provided with an orifice 111 which can register, according to the position of the valve member 107, with one or the other of two orifices 112 and 113 in the valve member. This latter is provided with a recess 114 into which engages the pin 102 of the disk 90 when the same is in its normal intermediate position and neither of the coils 81 and 82 is excited.

Upon a change of speed the armature 85 is attracted in one or the other direction, and produces a rotation of the disk 90, for example to the position shown in Fig. 7. The pin 102, which before such rotation is engaged in the recess 114 of the valve member, acts against one side of the recess and turns the valve member to the position shown in Fig. 7, and then moves out of the recess until it arrives at the end of its stroke, as represented, when the armature 85 has completed its stroke of attraction. The orifice 113 then registers with the orifice 111 and the tube 52 can communicate with the atmosphere, thus permitting the piston 25 (Fig. 1) to move downwards with a speed corresponding to the rate of suction of air into the cylinder 26 through the opening 27, tube 52 and orifices 111 and 113. When the change of speed has been effected, the exciting current of the electro-magnet 80 is cut as explained above with respect to the electro-magnet 30 in Fig. 12, the disk 90 is returned to its normal position of rest by the spring 96, and the pin 102, entering again into the recess 114, also moves the valve member 107 back to its normal position. The piston 25 now moves upwards and the clutch C progressively engages with a speed which is dependent on the adjustment of the cock 61. Obviously, this cock 61 could also be constructed in similar manner as the cock 103 just described.

It will be understood that the above described structures are merely illustrative of the manner in which the principles of the invention may be utilized and that I desire to comprehend within my invention such modifications as come within the scope of the appended claims.

I claim:

1. In a motor vehicle having a clutch and a change speed mechanism, an acceleration control, means for effecting a change of speed, means for actuating said clutch to disengage and engage the same, a retarding device controlling the duration of a change of speed and of the actuation of the clutch, and regulating means responsive to the position of said acceleration control for controlling the action of the retarding device.

2. In a motor vehicle having a clutch and a change speed mechanism, an acceleration control, means for effecting a change of speed, means for actuating said clutch to disengage and engage the same, a retarding device controlling the duration of a change of speed and of the actuation of the clutch, regulating means responsive to the position of the speed change mechanism, and regulating means responsive to the position of the acceleration control, said two regulating means being effective to control the action of the retarding device.

3. In a motor vehicle having a clutch and a change speed mechanism, means for effecting a change of speed, means for actuating said clutch to disengage and engage the same, a throttle valve, automatically operative means to momentarily open the throttle valve when changing from higher to lower speed and to momentarily close the throttle valve when changing from lower to higher speed, a retarding device for controlling the duration of a change of speed and of the actuation of the clutch, regulating means responsive to the position of the throttle valve for controlling the action of said retarding device during disengagement of the clutch, and regulating means responsive to the position of the change speed mechanism for controlling the action of said retarding device during engagement of the clutch.

4. In a motor vehicle having a clutch and a change speed mechanism, means for effecting a change of speed, means for actuating said clutch to disengage and engage the same, a throttle valve, a movement transmission device for actuating said throttle valve, said transmission device including a yieldable transmission element actuated by the driver of the vehicle, and a rigid transmission element automatically actuated upon effecting a change of speed to momentarily close the throttle valve when changing from lower to higher speed and to momentarily increase the opening of the valve when changing from higher to lower speed, a retarding device adapted to progressively let in the clutch, and regulating means responsive to the position of the change speed mechanism to control the action of said retarding device.

5. In a motor vehicle having a clutch and a change speed mechanism, means for effecting a change of speed, means for actuating said clutch to disengage and engage the same, a throttle valve controlling the admission to the motor, a movement transmission device for actuating said throttle valve, said transmission device including a yieldable transmission element actuated by the driver of the vehicle, and a rigid transmission element automatically actuated upon effecting a change of speed to momentarily speed up the motor when changing from a higher to a lower speed and to momentarily slow down the motor when changing from a lower to a higher speed, said transmission device, upon automatic actuation of said rigid transmission element, only transmitting to said throttle valve the movement corresponding to automatic actuation, irrespective of actuation of the yieldable element by the driver.

6. In a motor vehicle having a clutch and a change speed mechanism, servo-motor means for effecting a change of speed and for actuating said clutch to disengage and engage the same, a retarding device actuated by said servo-motor means and adapted to control the duration of a change of speed and of the actuation of the clutch, said retarding device including a cylinder and a piston movable therein to alternately create a compression and a depression of a working fluid, means for controlling the admission to the motor, said means being operable by the driver of the vehicle, means for automatically actuating said admission control means upon effecting a change of speed to momentarily speed up the motor when changing from a higher to a lower speed and to momentarily slow down the motor when changing from a lower to a higher speed, regulating means responsive to the position of the change speed mechanism to adjust the rate of compression in said cylinder to thereby control the action of the retarding device on the engaging movement of the clutch, and regulating means responsive to the position of the admission control means to adjust the rate of depression in said cylinder.

7. In a motor vehicle having a clutch and a change speed mechanism, electromagnetic means for operating the clutch and for producing a change of speed, an admission control throttle, a movement transmission device for actuating said throttle, said device including a transmission element operable by the driver of the vehicle, a rotatable actuating rod connected to said throttle, electromagnetic means operatively connected to said rod to automatically actuate said throttle upon effecting a change of speed, a spring yieldably connecting said rod to the transmission element operable by the driver, energization of said electromagnetic means connected to said rod being effective to decrease the admission when changing from a lower to a higher speed and to increase the admission when changing from a higher to a lower speed, one end of said spring being connected to said rod to turn with the rod in one direction of rotation only, and the other end of said spring being connected to said rod to turn with the rod in the other direction of rotation only, whereby the spring is tensioned upon rotation of said rod by the action of said electromagnetic means and is operative to return said rod to normal position upon deenergization of said electro-magnetic means.

8. In a motor vehicle having a clutch and a change speed mechanism, electromagnetic means for effecting a change of speed and for actuating the clutch, an admission throttle, means operable by the driver of the vehicle to actuate said throttle, electromagnetic means automatically operating said throttle upon effecting a change speed to momentarily increase the admission when changing from a higher to a lower speed and to momentarily decrease the admission when changing from a lower to a higher speed, a retarding device operatively connected to said clutch and to said change speed mechanism, said retarding device including a cylinder and a piston movable therein to alternately create a compression and a depression of a working fluid, a regulating cock adjusting the admission of working fluid in said cylinder in response to the position of the admission throttle to control the rate of depression in the cylinder and thereby the duration of a change of speed, a regulating cock adjusting the exhaust of working fluid from said cylinder in response to the engaged speed to control the rate of compression in the cylinder and thereby the duration of engagement of the clutch, and a manually operable regulating cock adapted to adjust the rate of pressure variation in said cylinder.

9. A motor vehicle as defined in claim 8, wherein said manually operable regulating cock is adapted to be brought to three regulating positions, one of said positions corresponding to a manual control of the rate of compression of the working fluid, the second position corresponding to a manual control of the rate of depression of the working fluid, and the third position corresponding to a simultaneous manual control of the rate of compression and of depression of the working fluid.

10. A motor vehicle as defined in claim 8, wherein fluid conduits are provided between said cylinder of the retarding device and the two regulating cocks controlling the admission and the exhaust of working fluid to and from the cylinder, valves being inserted in said conduits, one of said valves being operative to establish communication between the cylinder and the regulating cock responsive to the position of the admission throttle during the period of depression in the cylinder and to prevent such communication during the period of compression, and the other valve being operative to establish communication between the cylinder and the regulating cock responsive to the engaged speed during the period of compression and to prevent such communication during the period of depression in the cylinder.

ERNEST ALPHONSE DERUNGS.